UNITED STATES PATENT OFFICE.

JOSEPH BEASLEY, OF HANDSWORTH, COUNTY OF STAFFORD, ENGLAND, ASSIGNOR TO JOHN HOWARD MITCHELL, OF PHILADELPHIA, PENNSYLVANIA.

PROCESS OF PURIFYING IRON.

SPECIFICATION forming part of Letters Patent No. 374,651, dated December 13, 1887.

Application filed October 19, 1885. Serial No. 180,339. (No specimens.) Patented in France October 13, 1882, No. 151,555, and in England May 5, 1884, No. 7,237.

*To all whom it may concern:*

Be it known that I, JOSEPH BEASLEY, a subject of Her Majesty the Queen of Great Britain, residing at Handsworth, in the county of Stafford, England, have invented a certain new and useful Improved Process for Purifying Iron, (for which I have obtained Letters Patent in Great Britain, No. 7,237, dated May 5, 1884, and a patent of addition in France, No. 151,555, dated October 13, 1882;) and I do hereby declare that the following is a full, clear, and exact description of the invention, which will enable others skilled in the art to which it appertains to make and use the same.

This invention relates to the manufacture, by the puddling process, of a superior class of iron from either low-grade gray or cinder pig metal.

The invention consists of certain improvements on the invention as described in the specification of my United States Letters Patent No. 302,088. I now find that when treating impure or low-grade metal in a puddling or other furnace good results will be obtained if rich iron ores are added to the ingredients for the lining previously proposed by me, and I therefore mix with the calcined tap-cinder or hammer or squeezer slag rich iron ores, and moisten these substances with diluted hydrochloric acid, and add to the mixture ground quicklime and salt, the molten metal being further treated by a physic of iron borings or turnings, or even rich iron ore saturated with diluted hydrochloric acid and reduced to the condition of a rusted powder, while if the metal contain a large amount of phosphorus, tap-cinder or hammer-slag saturated with the diluted acid is also used in the furnace-bottom.

In order that my present invention may be clearly understood, I will describe my method of practicing the same when treating pig-iron containing, say, one and one-half to two per cent. of phosphorus, as pig of this class is well known in the trade.

I take of calcined tap-cinder, with or without hammer or squeezer slag, about one-third, by weight, and of rich iron ores—such as hematites—about two-thirds. These I mix and reduce to the condition of a fine sand, and then moisten the whole mass with about five per cent. of hydrochloric acid diluted with about the same or a slightly greater quantity of hot or cold water, the former being preferable. This mixture should be made three or four days before it is to be used, and should be turned over from time to time, so that the action of the acid on the materials shall be as nearly uniform as possible and the mixture itself become nearly dry, when for each one hundred pounds of it is added about thirty pounds of ground quicklime and from two and one-half to five pounds of salt. The entire mass, being intimately mixed, is moistened with sufficient water to bring it to the condition of a thick mortar, which is plastered over the lumps of ore or other ordinary fettling used around the edges of the furnace, or when new fettling is required. Over this fettling and on the bottom of the furnace is placed in a dry state about one hundred pounds (for each five hundred and ten pounds of pig treated) of a second mixture in which there is one-third, by weight, of ore, two-thirds of hammer or squeezer slag, and about six per cent. each of hydrochloric acid and, preferably, hot water, the mass being treated, as before described, with acid, left for three days, and twenty-two per cent. of ground quicklime and two and one-half per cent. of salt added prior to using. After the pig has been thoroughly melted and the slag begins to thicken there is added to the bath about ten pounds of physic for each charge or heat of, say, five hundred and ten pounds of pig. This physic I make from the borings or turnings of cast or wrought iron or steel, or even from rich iron ore; but the cast-iron is preferred. The material used is treated with about seven per cent. of hydrochloric acid diluted with about an equal weight of cold water and is exposed to the atmosphere and turned over from time to time. In about a fortnight it will be found converted into a rusted powder, and is then in the best condition for use. The addition of this physic to the bath in the proportion stated will cause violent ebullition, and the iron will be found to be more thoroughly purified when it is used.

If the pig to be treated contains a very large percentage of phosphorus—say from two and one-half to four per cent.—I substitute for the ordinary bath or slag at the bottom of the furnace in which the iron is to be worked a mixture of puddlers' tap-cinder or hammer-slag saturated with about five per cent. of hydrochloric acid diluted with hot water. This mixture should stand for about a week before being used and should be turned over from time to time.

I have found that by the aid of my invention not only is there an increased and more rapid output, but that by it I am enabled from the cheapest class of gray and cinder pig to produce good puddled bars, which, when cut, piled, and reheated, I have rolled down in one working to high-class fibrous merchant bars capable of standing a tensile strain averaging from twenty-four to twenty-five tons per square inch.

The main differences between this invention and that previously patented to me in said Letters Patent No. 302,088 are, first, the use of rich iron ore in conjunction with the cinder and acid; second, the use of iron borings or turnings reduced to rusted powder by acid; third, the supplemental bath for pig rich in phosphorus.

I do not claim the process of manufacturing iron which consists in treating molten iron in a furnace fettled or lined with a mixture of calcined tap-cinder and hammer-slag and salt saturated with diluted hydrochloric acid and lime or limestone; neither do I claim the process of manufacturing iron which consists in treating molten iron in a furnace fettled or lined with a mixture of calcined tap-cinder or hammer-slag and salt saturated with diluted hydrochloric acid and lime or limestone, and adding to the molten bath a physic composed of the same substances, the same forming the subject of my patent hereinbefore referred to; but, Having fully described my invention, what I claim is—

1. The improved process of purifying iron, which consists in melting the metal in a furnace fettled or lined with a mixture of calcined tap-cinder or hammer or squeezer slag, and, as a main ingredient, ore rich in iron, previously moistened with dilute hydrochloric acid, and to which ground quicklime and salt are subsequently added, and then physicing the bath with ferruginous material previously reduced to a rusted powder by the action of dilute hydrochloric acid, substantially as described.

2. The improved process of purifying iron which contains a large percentage of phosphorus, which consists in melting the metal in a furnace fettled or lined with a mixture of calcined tap-cinder or hammer or squeezer slag, and, as a main ingredient, ore rich in iron, which mixture has been previously moistened with dilute hydrochloric acid, and to which ground quicklime and salt are subsequently added, the bath or slag in which the iron is to be worked being formed from tap-cinder or slag saturated with hydrochloric acid, and then physicing the molten bath with ferruginous material reduced to the condition of a rusted powder by the action of dilute hydrochloric acid, substantially as set forth.

September 30, 1885.

JOSEPH BEASLEY.

Witnesses:
RICHARD C. GRIFFIN,
GEORGE ROBERTS.